Figure 1:
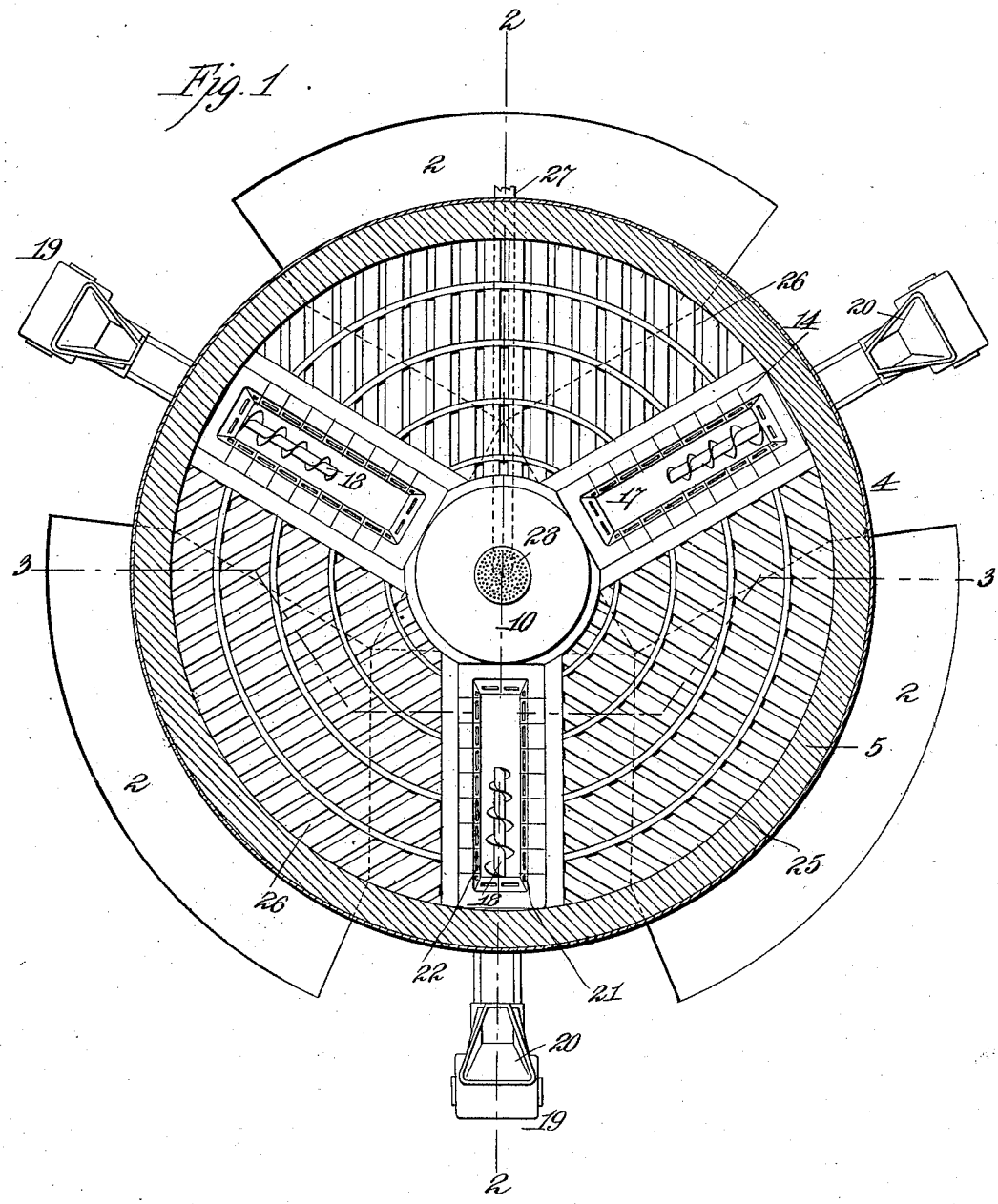

No. 717,266.  
R. C. PEABODY.  
GAS PRODUCER.  
(Application filed Oct. 25, 1901.)

Patented Dec. 30, 1902.

(No Model.)

3 Sheets—Sheet 1.

Witnesses:

Inventor  
Royal C. Peabody

No. 717,266. Patented Dec. 30, 1902.
R. C. PEABODY.
GAS PRODUCER.
(Application filed Oct. 25, 1901.)
(No Model.) 3 Sheets—Sheet 2.
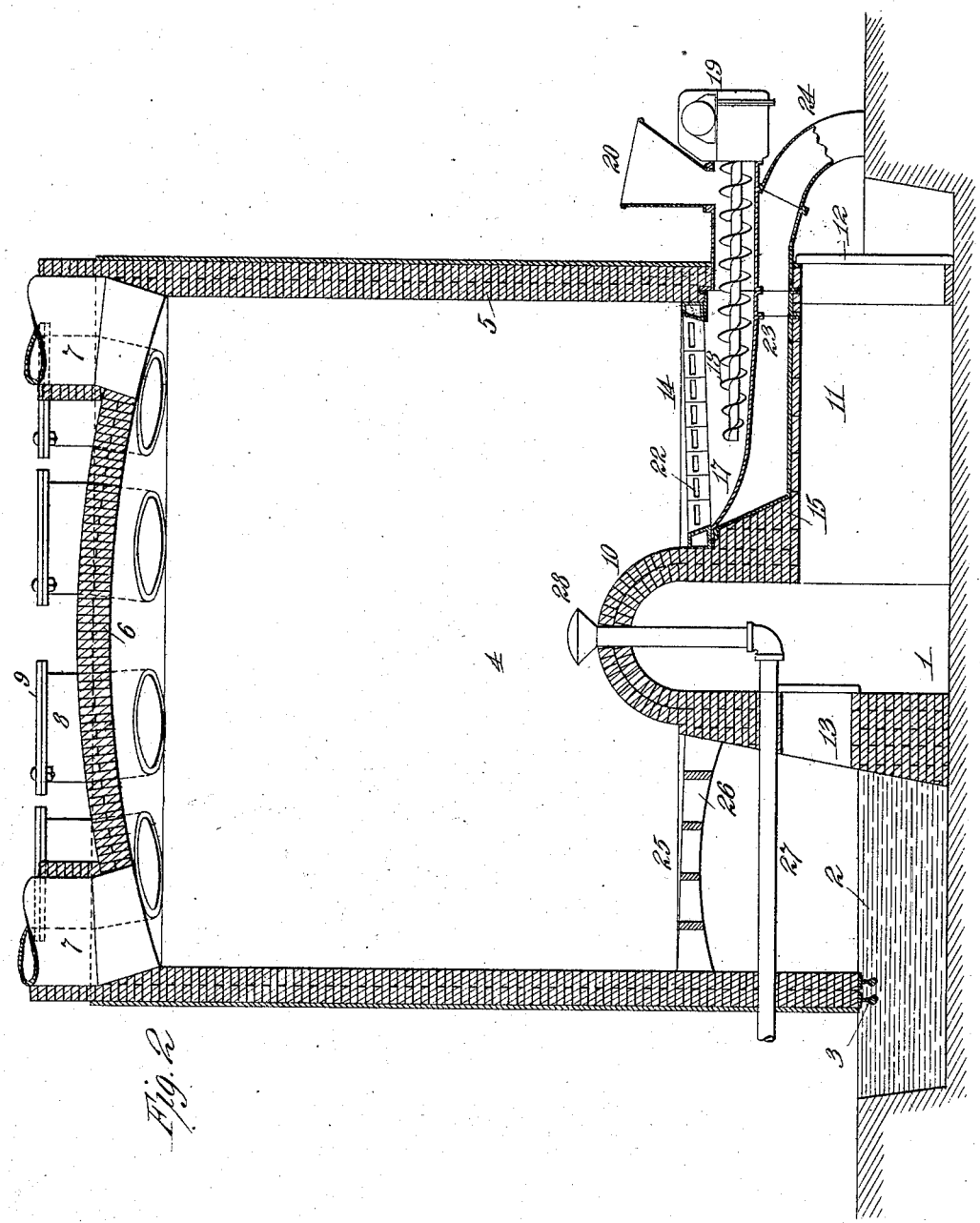
Witnesses:
Inventor
Royal C. Peabody

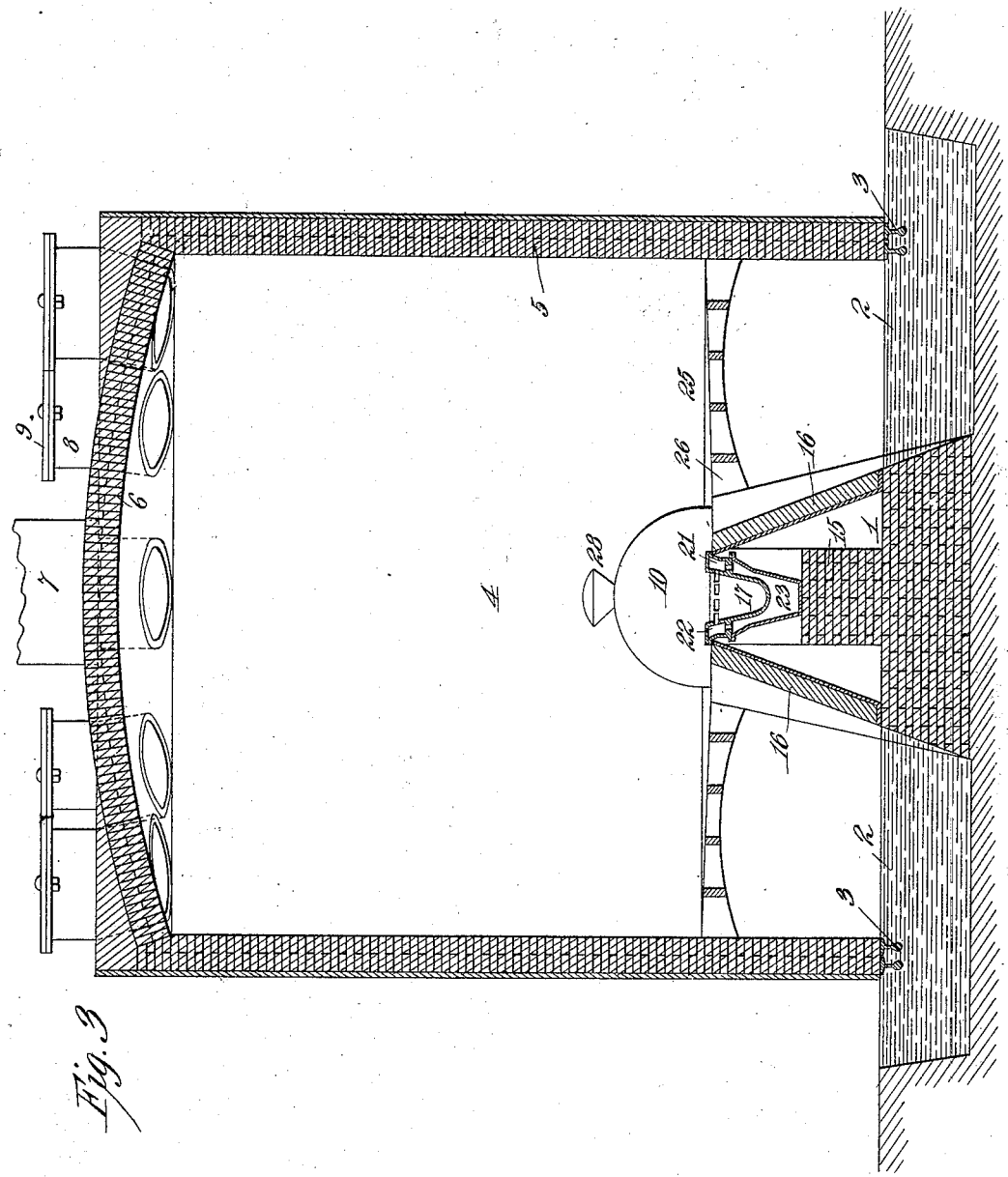

UNITED STATES PATENT OFFICE.

ROYAL C. PEABODY, OF BROOKLYN, NEW YORK.

GAS-PRODUCER.

SPECIFICATION forming part of Letters Patent No. 717,266, dated December 30, 1902.

Application filed October 25, 1901. Serial No. 79,890. (No model.)

*To all whom it may concern:*

Be it known that I, ROYAL C. PEABODY, a citizen of the United States, residing in the borough of Brooklyn, city of New York, State of New York, have invented a certain new and useful Improvement in Producer-Gas Generators, of which the following is a description.

My invention relates to an improved apparatus for generating producer-gas of the type wherein the green fuel is fed upwardly into a body of incandescent coke with a sufficiently-limited air-supply to prevent the combustion of the gases formed by the distillation, whereby the resulting producer-gas will be practically wholly composed of free hydrogen and carbonic-oxid gases and will be free from unstable hydrocarbons, which with other forms of gas-producer apparatus now in use require to be eliminated by a subsequent purifying process. The apparatus also preferably contemplates the admission of steam into the producer-chamber for furnishing the necessary pressure in the generated gas and also when decomposed by the heat to supplement the hydrogen component of the resulting producer-gas and to furnish oxygen for the oxidation of any carbonic-acid gas which may be generated to convert the latter into carbonic-oxid gas.

My object is to provide a simple and relatively economical apparatus for the purpose which shall be capable of generating a practically stable producer-gas in large quantities and with good efficiency and wherein a practically continuous operation will be effected.

To this end the invention comprises a closed producer-chamber having one or more exit-pipes for the gas at its upper end and preferably, also, one or more hoppers thereat for the introduction of fuel for starting the apparatus, a series of automatic stokers radially mounted in the lower part of the chamber and automatically supplying green fuel to the same, a suitable foraminated or slotted supporting-surface between the stokers and on which the combustion takes place, the ashes falling through the openings in said surface, and suitable water-sealed ash-pits between the stokers for receiving the ashes.

The invention also preferably comprises a hollow pier or pedestal located centrally within the producing-chamber and from which the stokers radiate, said chamber being reached by a passage connected with the exterior of the apparatus and permitting access to the interior of the producer-chamber for any purpose.

Preferably, also, the invention utilizes a steam-pipe leading into the chamber through the said hollow pedestal or pier and provided within the chamber with a distributing rose or nozzle by means of which steam will be properly supplied for facilitating the operation.

The stokers which I employ with my improved apparatus may be of any suitable type; but I prefer to make use of a well-known form of automatic stoker wherein an Archimedean screw or worm is mounted in the fuel-magazine and continuously forces fuel from a suitable receiving-hopper over the sides of said magazine, which are usually provided with twyers for admitting the proper air-supply from a wind-box partly surrounding the magazine.

In order that the invention may be better understood, attention is directed to the accompanying drawings, forming part of this specification, and in which—

Figure 1 is a horizontal sectional view of my improved apparatus; Fig. 2, a vertical sectional view on the line 2 2 of Fig. 1; and Fig. 3, a similar view on the line 3 3 of Fig. 1.

In all of the above views corresponding parts are represented by the same numerals of reference.

1 designates a suitable foundation made, preferably, of brickwork and provided with pits 2 therein which form water seals. In the apparatus illustrated employing three stokers I make use of a corresponding number of water seals, one between each pair of stokers, as shown. Mounted on the foundation 1 and on piers 3, bridging each of the pits 2, is a producer-chamber 4, made, preferably, of sheet metal lined with fire-brick 5. The top 6 of the chamber is arched, as shown, and is formed also preferably of fire-brick. Leading up from the chamber are one or more eduction-pipes 7 for the producer-gas, which pipes are ordinarily connected with a gas-main (not shown) which leads to a regenerative furnace or other device for utilizing the gas produced in the generator, and connected also with the top 6 are hoppers 8, having tightly-closed covers 9 and which are used for introducing fuel within the chamber in starting the producing operation. The covers 9 are sealed in any way with a gas-tight joint. At the center of the chamber is a hollow pedestal or pier 10, made of fire-brick, and the interior of which connects, by means of a passage 11, with the outside of the chamber, said passage being provided with a door 12 for closing it. Leading out of the hollow pier or pedestal is an opening 13, communicating with the interior of the producer-chamber and having a suitable gas-tight door for closing said opening. In this way the interior of the producer-chamber can be reached through the passage 11 and opening 13 for cleaning out the chamber, making repairs or changes in the stokers, or for other purposes. Radially arranged within the chamber are the automatic stokers 14, which abut at their inner ends against the pier or pedestal 10. These stokers are supported in suitable brickwork 15 and also by means of inclined walls 16, which lead from the top of the stokers to the pits 2, as shown. The stokers are of any suitable type, but, as stated, are preferably of the well-known form shown, each stoker comprising a magazine 17, having a curved bottom in which works an Archimedean screw 18, driven by a motor 19 on the outside of the chamber 4. A hopper 20, arranged outside of the chamber, supplies fuel to the magazine 17, and by means of the screw or worm 18 this fuel is fed longitudinally of the magazine and caused to pile up over its sides. At its upper end the magazine is provided with twyers 21 and 22, supplied with air from a suitable wind-box 23, connected with a duct 24, leading to the atmosphere and by means of which a supply of air insufficient to support complete combustion will be admitted to the interior of the producer-chamber, as will be understood. Bridging the space between the inclined walls 16 is a foraminated supporting-surface 25, on which the fuel is sustained. As shown, this foraminated surface is preferably a fire-brick arch with openings 26 therein, said openings being sufficiently small to prevent the passage of fuel through them, but permitting the escape of the finer ashes into the water-sealed ash-pits. Instead of making use of a fire-brick arch, as explained, it will of course be understood that any equivalent supporting-surface may be employed for allowing the passage of the ashes to the ash-pit—as, for example, an ordinary grate-bar arrangement. Leading into the hollow pedestal or pier 10 from the outside is a steam-pipe 27, which extends upwardly within the producer-chamber and is provided at its end with a distributing nozzle or rose 28. Steam at the desired pressure is supplied to the pipe 27 to facilitate the operation, as is common in the art.

In the generation of producer-gas by means of my improved apparatus I proceed as follows: Water is supplied to the pits 2 to form a suitable water seal, and a wood fire being started within the chamber fresh coke or coal is introduced within the chamber through the hoppers 8. After the coke has been brought to a condition of incandescence the hopper-doors 9 are closed, and introduction of green fuel into the chamber is effected entirely by the stokers 14. The stokers introduce green fuel into the body of incandescent coke from below, and in the presence of an air-supply insufficient to support complete combustion producer-gas will be formed, as will be understood. Any carbonic-acid gas which may be generated will, in passing through the body of coke and in the presence of steam furnished thereto, be converted into carbonic-oxid gas, so as to be entirely stable. The steam introduced in addition to oxidizing any of such unstable gases will in being decomposed in its passage through the incandescent coke furnish free hydrogen to supplement the hydrogen component of the gas, as will be understood.

It will be obvious that the apparatus is simple in construction, it possesses few parts to get out of order, and in operation it possesses the great advantage of generating a practically stable producer-gas in large quantities at a minimum cost.

Having now described my invention, what I claim as new, and desire to secure by Letters Patent, is as follows:

1. In a producer-gas apparatus, the combination of a producer-chamber, a hollow pier or pedestal within said chamber and communicating with the exterior of the chamber, said pier or pedestal having an opening leading from its interior to the interior of the chamber, and a series of stokers within the chamber near its lower end radiating from said pier or pedestal, substantially as set forth.

2. In a producer-gas apparatus, the combination of a producer-chamber, a hollow pier or pedestal within said chamber and communicating with the exterior of the chamber, said pier or pedestal having an opening leading from its interior to the interior of the chamber, a series of stokers within the chamber near its lower end radiating from said pier or pedestal, and foraminated surfaces between said stokers for supporting the fuel, substantially as set forth.

3. In a producer-gas apparatus, the combination of a producer-chamber, a hollow pier or pedestal within said chamber and communicating with the exterior of the chamber, said pier or pedestal having an opening leading from its interior to the interior of the chamber, a series of stokers within the chamber near its lower end radiating from said pier or pedestal, and a steam-pipe entering the chamber and mounted in said pier or pedestal, substantially as set forth.

4. In a producer-gas apparatus, the combination of a generating-chamber, a series of underfeed-stokers mounted in said chamber near its bottom, inclined walls extending downwardly from each of said stokers, and foraminated surfaces located between said inclined walls for supporting the fuel, substantially as set forth.

5. In a producer-gas apparatus, the combination of a generating-chamber, a series of underfeed-stokers mounted in said chamber near its bottom, inclined walls extending downwardly from each of said stokers, foraminated surfaces located between said inclined walls for supporting the fuel, and an ash-pit below each of said foraminated surfaces, substantially as set forth.

This specification signed and witnessed this 24th day of October, 1901.

ROYAL C. PEABODY.

Witnesses:
   JNO. ROBT. TAYLOR,
   JNO. LOUIS LOTSCH.